(12) United States Patent
Price et al.

(10) Patent No.: US 11,538,170 B2
(45) Date of Patent: Dec. 27, 2022

(54) INTEGRATED INTERACTIVE IMAGE SEGMENTATION

(71) Applicant: ADOBE INC., San Jose, CA (US)

(72) Inventors: Brian Lynn Price, Pleasant Grove, UT (US); Scott David Cohen, Cupertino, CA (US); Henghui Ding, Boon Lay (SG)

(73) Assignee: ADOBE INC., San Jose, CA (US)

(*) Notice: Subject to any disclaimer, the term of this patent is extended or adjusted under 35 U.S.C. 154(b) by 206 days.

(21) Appl. No.: 16/839,209

(22) Filed: Apr. 3, 2020

(65) Prior Publication Data

US 2021/0312635 A1 Oct. 7, 2021

(51) Int. Cl.
*G06T 7/00* (2017.01)
*G06T 7/143* (2017.01)
*G06K 9/62* (2022.01)
*G06N 3/08* (2006.01)
*G06N 7/00* (2006.01)
(Continued)

(52) U.S. Cl.
CPC ............ *G06T 7/143* (2017.01); *G06K 9/6232* (2013.01); *G06N 3/08* (2013.01); *G06N 7/005* (2013.01); *G06V 10/40* (2022.01); *G06T 2207/20081* (2013.01); *G06T 2207/20084* (2013.01); *G06V 10/248* (2022.01)

(58) Field of Classification Search
CPC ........... G06T 7/143; G06T 2207/20081; G06T 2207/20084; G06T 2207/10024; G06T 2207/20101; G06T 7/187; G06T 7/194; G06T 7/11; G06K 9/46; G06K 9/6232; G06K 2009/366; G06N 3/08; G06N 7/005; G06N 3/0445
See application file for complete search history.

(56) References Cited

U.S. PATENT DOCUMENTS

2019/0197691 A1* 6/2019 Chen ....................... G06T 17/10
2020/0167930 A1* 5/2020 Wang ................... G06T 7/0012

OTHER PUBLICATIONS

Majumder et al, Scale-aware multi-level guidance for interactive instance segmentation, arXiv:1812.02967v1 (Dec. 7, 2018).*

(Continued)

*Primary Examiner* — Nancy Bitar
*Assistant Examiner* — Xiao Liu
(74) *Attorney, Agent, or Firm* — Shook, Hardy & Bacon L.L.P.

(57) ABSTRACT

Methods and systems are provided for optimal segmentation of an image based on multiple segmentations. In particular, multiple segmentation methods can be combined by taking into account previous segmentations. For instance, an optimal segmentation can be generated by iteratively integrating a previous segmentation (e.g., using an image segmentation method) with a current segmentation (e.g., using the same or different image segmentation method). To allow for optimal segmentation of an image based on multiple segmentations, one or more neural networks can be used. For instance, a convolutional RNN can be used to maintain information related to one or more previous segmentations when transitioning from one segmentation method to the next. The convolutional RNN can combine the previous segmentation(s) with the current segmentation without requiring any information about the image segmentation method(s) used to generate the segmentations.

20 Claims, 11 Drawing Sheets

(51) Int. Cl.
G06V 10/40 (2022.01)
G06V 10/24 (2022.01)

(56) References Cited

OTHER PUBLICATIONS

Price et al, Geodesic graph cut for interactive image segmentation, 2010 IEEE Conf. on Computer Vision and Pattern Recognition (CVPR), pp. 3161-3168. (Year: 2010).*

Xu, N., Price, B., Cohen, S., Yang, J., & Huang, T. S. (2016). Deep interactive object selection. In Proceedings of the IEEE Conference on Computer Vision and Pattern Recognition (pp. 373-381).

Yu, L., Lin, Z., Shen, X., Yang, J., Lu, X., Bansal, M., & Berg, T. L. (2018). Mattnet: Modular attention network for referring expression comprehension. In Proceedings of the IEEE Conference on Computer Vision and Pattern Recognition (pp. 1307-1315).

Boykov, Y. Y., & Jolly, M. P. (Jul. 2001). Interactive graph cuts for optimal boundary & region segmentation of objects in ND images. In Proceedings eighth IEEE international conference on computer vision. ICCV 2001 (vol. 1, pp. 105-112). IEEE.

Li, Y., Sun, J., Tang, C. K., & Shum, H. Y. (2004). Lazy snapping. ACM Transactions on Graphics (ToG), 23(3), 303-308.

Grady, L. (2006). Random walks for image segmentation. IEEE transactions on pattern analysis and machine intelligence, 28(11), 1768-1783.

Bai, X., & Sapiro, G. (Oct. 2007). A geodesic framework for fast interactive image and video segmentation and matting. In 2007 IEEE 11th International Conference on Computer Vision (pp. 1-8). IEEE.

Criminisi, A., Sharp, T., & Blake, A. (Oct. 2008). Geos: Geodesic image segmentation. In European Conference on Computer Vision (pp. 99-112). Springer, Berlin, Heidelberg.

Long, J., Shelhamer, E., & Darrell, T. (2015). Fully convolutional networks for semantic segmentation. In Proceedings of the IEEE conference on computer vision and pattern recognition (pp. 3431-3440).

Papadopoulos, D. P., Uijlings, J. R., Keller, F., & Ferrari, V. (2017). Extreme clicking for efficient object annotation. In Proceedings of the IEEE international conference on computer vision (pp. 4930-4939).

Maninis, K. K., Caelles, S., Pont-Tuset, J., & Van Gool, L. (2018). Deep extreme cut: From extreme points to object segmentation. In Proceedings of the IEEE Conference on Computer Vision and Pattern Recognition (pp. 616-625).

Kazemzadeh, S., Ordonez, V., Matten, M., & Berg, T. (Oct. 2014). Referitgame: Referring to objects in photographs of natural scenes. In Proceedings of the 2014 conference on empirical methods in natural language processing (EMNLP) (pp. 787-798).

* cited by examiner

INTEGRATED INTERACTIVE IMAGE SEGMENTATION

BACKGROUND

Images are oftentimes segmented, for example, to allow editing of the image. Image segmentation is generally the process of generating a segment of an image. Such a segment can be visualized in an editing environment using a mask that indicates the segmented portion of an image to which edits will be applied as opposed to the portions of the image that will not be affected by edits. A segment can be created along boundaries within an image so that the segment designates an object and/or feature within the image. For instance, in a portrait of an individual, the image can be segmented into a segment of the individual's face or a segment of the background or, if more detail is desired, into a segment of the individual's eyes, a segment of the individual's teeth, a segment of the individual's hair, etc. As such, using a mask for such a portrait can indicate that edits will only be applied to the emphasized portion(s) of the image and not the deemphasized portion(s).

SUMMARY

Embodiments of the present disclosure are directed towards an integrated segmentation system that allows for optimal segmentation of an image based on multiple segmentations. In accordance with embodiments of the present disclosure, the integrated segmentation system allows multiple segmentation methods (e.g., different segmentation techniques implemented using various segmentation tools) to be combined by taking into account previous segmentations. For instance, an optimal segmentation can be generated by iteratively integrating a previous segmentation (e.g., using an image segmentation method) with a current segmentation (e.g., using the same or different image segmentation method). To create such an integrated segmentation system, one or more neural networks can be used. For instance, the integrated segmentation system can implement a convolutional RNN to maintain information related to one or more previous segmentations when transitioning from one segmentation method to the next. The convolutional RNN can combine the previous segmentation(s) with the current segmentation without requiring any information about the image segmentation method(s) used to generate the segmentations.

The convolutional RNN can integrate segmentation methods using information related to probability distribution maps related to image segmentations. For instance, the convolutional RNN can be used to determine a feature map for an image. Such a feature map can then be combined with a current probability distribution map (e.g., from a current segmentation method) and a previous probability distribution map (e.g., from a previous segmentation method). In particular, the feature map can be combined with the current probability distribution map to generate a first feature (e.g., the combination of the feature map and the current probability distribution map). Further, the feature map can be combined with the previous probability distribution map to generate a second feature (e.g., the combination of the feature map and the previous probability distribution map). The first and second feature can then be concatenated to generate an updated probability distribution map. This updated probability distribution map incorporates information related to the current segmentation method and the previous segmentation method. Such a process can be repeated until the updated segmentation mask is an optimal segmentation mask.

DETAILED DESCRIPTION

Figure 1A:
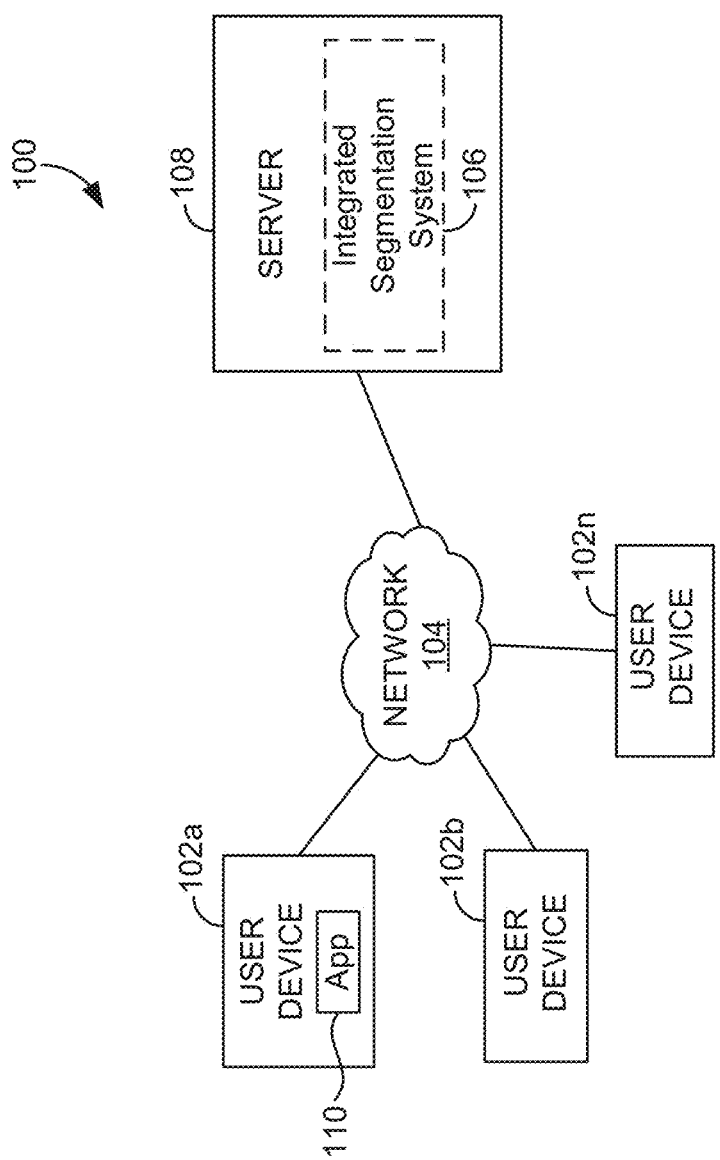
FIG. 1A depicts an example configuration of an operating environment in which some implementations of the present disclosure can be employed, in accordance with various embodiments of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, users desire for intuitive editing of images. For instance, users might desire editing that does not require expertise of difficult tools within an editing system or editing that is not highly repetitive and time-consuming. One manner in which to edit images is using segmentation. Image segmentation can designate a segment within an image such that the segment can be edited. Such a segment can be visualized using a segmentation mask that indicates the segmented portion of an image to which edits will be applied, as opposed to the portions of the image that will not be affected by edits. However, there can be difficulties in segmenting an image such that the generated segmentation mask relates to the exact portion of an image a user desires to segment. For example, in an image of a dog in a field, a first segmentation tool (e.g., that uses a first segmentation method) might not include the dog's ears in a generated segmentation mask. In an attempt to modify the generated segmentation mask, a second segmentation tool can be selected. However, in most conventional systems, upon selecting the second segmentation tool (e.g., that uses a second segmentation method), the initially generated segmentation mask is often deleted and a completely new segmentation mask is generated (that still might not include the dog's ears in a generated segmentation mask). As such, it is difficult to combine various segmentation tools when trying to segment an image. In an attempt to overcome this difficulty in combining various segmentation tools, segmentation masks generated using different segmentation tools have been combined by averaging the two segmentation masks. However, this can lead to a combined segmentation mask that still contains inaccuracies (e.g., not including a dog's ears in the combined segmentation mask).

With the advancement of technology, various methods for image segmentation have been developed in an attempt to more easily and accurately segment images. For instance, various deep learning techniques (e.g., based on neural networks) have been implemented that quickly and intelligently segment images. However, even when using these deep learning based techniques to generate a segment for an image, there has been difficulty in combining multiple segmentation tools when segmenting an image. Oftentimes, as mentioned previously, if a new segmentation tool is applied to an image, any segmentations made using a previous segmentation tool will be lost. One manner that has been attempted to combine segmentation tools that use various deep learning techniques requires complete retraining of neural networks that relate to the segmentation tools to combine the tools each time a new segmentation tool is added. Retraining of the neural networks to take into account previous segmentations generated by other tools (e.g., using different methods) is computationally expensive and limits scalability of a system. In this way, existing technologies are generally deficient in allowing the combination of various segmentation tools in a scalable and computationally efficient manner that takes into account previous segmentations of an image.

Accordingly, embodiments of the present disclosure are directed to an integrated segmentation system that allows for optimal segmentation of an image based on multiple segmentations. In particular, the integrated segmentation system allows multiple segmentation methods (e.g., performed using various segmentation tools) to be combined by taking into account previous segmentations. Such segmentation methods can include segmentation based on deep learning techniques, color range or saliency detection, thresholding, clustering methods, compression-based methods, histogram-based methods, edge detection, dual clustering methods, region-growing methods, partial differential equation-based methods, variational methods, graph partitioning methods, watershed transformation, model based segmentation, multi-scale segmentation, and semi-automatic segmentation.

Combining multiple segmentation methods allows a user to easily obtain an optimal segmentation of an image. For instance, an optimal segmentation can be generated by iteratively integrating a previous segmentation (e.g., using an image segmentation method) with a current segmentation (e.g., using the same or different image segmentation method). As an example, as a user interacts with an image, a previous segmentation method(s) that has been applied to the image can be integrated into an updated image segmentation. In this way, segmenting an image using the integrated segmentation system allows for multiple interactive image segmentation methods to be assimilated into an overall integrated image segmentation process. Advantageously, combining various image segmentation methods in such a manner leverages the strengths of each of the various image segmentation methods when generating a segmentation mask based on an optimal image segmentation for an image.

In more detail, embodiments of the present disclosure are directed to an integrated segmentation system that is user-friendly and compatible with any interactive image segmentation method. In particular, and as described herein, the integrated segmentation system can integrate various interactive image segmentation methods into a unified library. This unified library allows various image segmentation methods to build upon one another in response to interactions indicating a desired segmentation for an image (e.g., click, swipe, bounding box). As an example, a user can interact with the image using a first image segmentation method to indicate that a dog should be included in the segmentation and the first image segmentation method can generate a first segmentation mask that does not include the dog's ears. Using a second image segmentation method, the user can indicate that the dog's ears should be contained in the segmentation. The integrated segmentation system of the present disclosure allows for the first segmentation mask to be taken into account when the second image segmentation method is used to segment the image to generate an optimal segmentation mask (e.g., that contains the dog and the dog's ears). Advantageously, the unified library of the integrated segmentation system allows a user to interact with an image using any type of interaction input that best indicates their desired segmentation for the image. In this way, the integrated segmentation system allows the user to interact with the image in an intuitive and straightforward manner to obtain an optimal segmentation mask.

To integrate multiple segmentation methods into an optimal segmentation of an image, information related to a previous segmentation can be integrated into a current segmentation. In an embodiment, the integrated segmentation system can be implemented using one or more neural networks. A neural network generally refers to a computational approach using large clusters of connected neurons. For example, a neural network can be comprised of fully connected layers. Neural networks are self-learning and trained rather than explicitly programmed such that a generated output of a neural network reflects a desired result. In embodiments, the integrated segmentation system can include of one or more neural networks based on a convolutional recurrent neural network (RNN) architecture. For instance, the integrated segmentation system can implement a convolutional RNN to maintain information related to one or more previous segmentations when transitioning from one segmentation method to the next.

The integrated segmentation system can use a convolutional RNN to integrate information related to a previous segmentation(s) when performing a current segmentation. The convolutional RNN can combine the previous segmentation(s) with the current segmentation without requiring any information about the image segmentation method(s) used to generate the segmentations. In this way, the integrated segmentation system is highly scalable, as any image segmentation method can be used to generate the segmentations. For instance, a new image segmentation method can be added to the integrated segmentation system, even when the convolutional RNN has not been previously used to integrate the image segmentation method.

Integration to combine a previous segmentation(s) with a current segmentation can be performed based on a convolutional RNN receiving and combining information related to a previous segmentation of an image with information related to a current segmentation of the image. Such information can comprise at least a probability distribution map. A probability distribution map can generally be the output of a segmentation method (e.g., segmentation mask, heat map, etc.). From this probability distribution map, a segmentation mask can be generated. In particular, the convolutional RNN can receive information related to a previous probability distribution map. Using this information, the convolutional RNN can generate a hidden state based on the information related to the previous probability distribution map. Subsequently, when a subsequent segmentation method is used to segment the image, the current probability distribution map (e.g., determined using the subsequent segmentation method) can be updated using this hidden state to generate an updated probability distribution map. In this way, the hidden state of the convolutional RNN can be used to incorporate information related to a previous segmentation into a current segmentation. The resulting updated probability distribution map can then be used to generate an updated segmentation mask (e.g. that incorporates the previous segmentation and the current segmentation). Such a process can be repeated until the updated segmentation mask is an optimal segmentation mask.

In more detail, the convolutional RNN can integrate segmentation methods using information related to probability distribution maps to segment an image. For instance, the convolutional RNN can be used to determine a feature map for an image. Such a feature map can then be combined with a current probability distribution map (e.g., from a current segmentation method) and a previous probability distribution map (e.g., from a previous segmentation method). In particular, the feature map can be combined with the current probability distribution map to generate a first feature (e.g., the combination of the feature map and the current probability distribution map). Further, the feature map can be combined with the previous probability distribution map to generate a second feature (e.g., the combination of the feature map and the previous probability distribution map). The first and second feature can then be concatenated to generate an updated probability distribution map. This updated probability distribution map incorporated information related to the current segmentation method and the previous segmentation method.

In some embodiments, the convolutional RNN can integrate removing image methods using information related to segmenting an image. A removal segmentation method can occur when an interactive object selection indicates that an object, individual feature, or portion of an image should be excluded from a desired segmentation mask. Typically, when performing a removing image segmentation method, there needs to be preexisting segmentation mask from which an object, feature, or portion can be selected for exclusion from a desired segmentation mask. Oftentimes, when a removing image segmentation method is being performed on an image as a first segmentation, there is not enough information to indicate what object, feature, or portion has be selected for exclusion from the image. For example, a first segmentation method can generate a first segmentation mask of a cat and dog when only the dog is desired. When a second segmentation method (e.g., a removing image segmentation method) is used to indicate that the cat should not be included in the segmentation mask, typically a removal segmentation tool will not have any information about the first segmentation mask of a cat and dog. For instance, the integrated segmentation system does not have any knowledge about the type of image segmentation method being used. As such, the integrated segmentation system can incorporate the removal information into the convolutional RNN such that the system keeps track of what object, feature, or portion of an image should be excluded from a desired segmentation mask.

In particular, the convolutional RNN can be used to determine a feature map for an image. Such a feature map can incorporate the removal information. For example, if the interactive object selection indicates removal of the cat, then information related to the cat can be removed from the determined feature map. This feature map (e.g., with information related to the cat removed) can then be combined with a current probability distribution map (e.g., from a current segmentation method) and a previous probability distribution map (e.g., from a previous segmentation method). In particular, the feature map can be combined with the current probability distribution map to generate a first feature (e.g., the combination of the feature map and the current probability distribution map). Further, the feature map can be combined with the previous probability distribution map to generate a second feature (e.g., the combination of the feature map and the previous probability distribution map). The first and second feature can then be concatenated to generate an updated probability distribution map. This updated probability distribution map incorporated information related to the current segmentation method and the previous segmentation method.

The convolutional RNN can be trained to integrate various interactive image segmentation methods. In one embodiment, two image segmentation methods can be used to train the convolutional RNN (e.g., PhraseCut and Deep Interactive Object Selection ("DIOS")). For instance, when a spoken language command is received, a language-based segmentation method (e.g., PhraseCut) can be used. When a click is received, a click-based segmentation method (e.g., DIOS) can be used. Initially, to train the convolutional RNN, a first segmentation method can be performed on an image. To perform the first segmentation method, an interactive object selection can be received that indicates which segmentation should be used (e.g., a spoken language command for PhraseCut and a click for DIOS). The first segmentation method can then be run to generate a probability distribution map. This probability distribution map can be fed into the convolutional RNN along with the image. The convolutional RNN can store a hidden state related to the first segmentation method and output an updated probability mask. Loss between the updated probability mask and a ground-truth mask can be used to update the convolutional RNN. For instance, pixel loss can be used.

In embodiments, the convolutional RNN does not have knowledge of the method that is used to generate the probability distribution map. Training the convolutional RNN without this knowledge ensures that the trained convolutional RNN will be extensible to any type of image segmentation method. For instance, even though the convolutional RNN can be trained using two image segmentation methods, the trained convolutional RNN can be used to integrate any number of image segmentation methods when performing optimal segmentation of an image.

In embodiments, a classifier neural network can generate a segmentation mask from the updated probability distribution map. Such a classifier neural network can receive a feature (e.g., in the form of the updated probability distribution map) and generate a final output (e.g., in the form of an optimal segmentation mask). For instance, the classifier neural network can include a decoder portion that can take the feature in a feature space that is not interpretable by a human and convert the feature back into an image state. In some embodiments, the classifier neural network can be trained in how to combine the features from the feature map combined with the current probability distribution map and the feature map combined with the previous probability distribution map. For instance, because the convolutional RNN does not have any knowledge of the image segmentation method used, the classifier neural network can use this information to intelligently combine a first feature related to a first image segmentation method with a second feature related to a second image segmentation method. As an example, if the first image segmentation method is more accurate related to the interior of objects but is not as accurate for edges and the second image segmentation method is less accurate related to the interior of objects but is more accurate for edges, the classifier neural network can combine the first and second features accordingly (e.g., favoring portions related to the more reliable/accurate methods).

Turning to FIG. 1A, FIG. 1A depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 1000 described in connection to FIG. 10, for example. These components may communicate with each other via a network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. The network 104 may be any network that enables communication among machines, databases, and devices (mobile or otherwise). Accordingly, the network 104 may be a wired network, a wireless network (e.g., a mobile or cellular network), a storage area network (SAN), or any suitable combination thereof. In an example embodiment, the network 104 includes one or more portions of a private network, a public network (e.g., the Internet), or combination thereof. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out image editing, such as, segmenting an image to generate a segmentation mask for use in editing the image. In some implementations, the application(s) comprises a web application, which can run in a web browser, and could be hosted at least partially on the server-side of environment 100. In addition, or instead, the application(s) can comprise a dedicated application, such as an application having image editing and/or processing functionality. For example, such an application can be configured to display images and/or allow the user to input or identify images for editing. In some cases, the application is integrated into the operating system (e.g., as a service). It is therefore contemplated herein that "application" be interpreted broadly. Example applications include Adobe® Photoshop®, LightRoom®, and the like.

In accordance with embodiments herein, application 110 can facilitate segmenting an image, presenting the segmentation as a segmentation mask, and editing the image using an optimal segmentation mask. In particular, a user can select or input an image or picture for segmentation. An image and/or picture can be selected or input in any manner. The application may facilitate the access of one or more images stored on the user device 102a (e.g., in a photo library), and/or import images from remote devices 102b-102n and/or applications, such as from server 108. For example, a user may take a picture using a camera on a device, for example, user device 102a. As another example, a user may select a desired image from a repository, for example, stored in a data store accessible by a network or stored locally at the user device 102a. Based on the input image, the input image can undergo segmentation using techniques, some of which are further discussed below with reference to integrated segmentation system 204 of FIG. 2, and a segmentation mask can be provided to the user via the user device 102a.

In particular, a user can perform an interactive object selection of an image using application 110. Such interactive object selection can be based on an interactive action (e.g., click, scribble, bounding box, and/or language). Based on the received interactive object selection, the image can be segmented using a selected segmentation method. After undergoing segmentation, a segmentation mask can be displayed to the user. The user can further interact with the image and displayed segmentation mask using additional interactive object selection(s). Such an interactive object selection can indicate further refinements that the user desires to have made to the displayed segmentation mask. From these additional interactive object selection(s), an updated segmentation mask (e.g., optimized segmentation mask) can be displayed to the user. Such an updated segmentation mask can be generated using integrated segmentation techniques discussed further below with reference to integrated segmentation system 204 of FIG. 2.

The user device can communicate over a network 104 with a server 108 (e.g., a Software as a Service (SAAS) server), which provides a cloud-based and/or network-based integrated segmentation system 106. The integrated segmentation system may communicate with the user devices and corresponding user interface to facilitate the segmentation and/or presenting of images to a user via the user device using, for example, application 110.

As described herein, server 108 can facilitate segmenting an image, generating an optimized segmentation mask, and presenting such segmentations as segmentation masks via integrated segmentation system 106. Server 108 includes one or more processors, and one or more computer-readable media. The computer-readable media includes computer-readable instructions executable by the one or more processors. The instructions may optionally implement one or more components of integrated segmentation system 106, described in additional detail below. Server 108 is capable of integrating various interactive image segmentation methods to generate an optimized segmentation mask. Such interactive image segmentation methods can be stored in a unified library. This unified library allows various image segmentation methods to build upon one another in response to interactions indicating a desired segmentation for an image (e.g., click, swipe, bounding box).

For cloud-based implementations, the instructions on server 108 may implement one or more components of integrated segmentation system 106. Application 110 may be utilized by a user to interface with the functionality implemented on server(s) 108, such as integrated segmentation system 106. In some cases, application 110 comprises a web browser. In other cases, server 108 may not be required, as further discussed with reference to FIG. 1B.

Thus, it should be appreciated that integrated segmentation system 106 may be provided via multiple devices arranged in a distributed environment that collectively provide the functionality described herein. Additionally, other components not shown may also be included within the distributed environment. In addition, or instead, integrated segmentation system 106 can be integrated, at least partially, into a user device, such as user device 102a.

Figure 1B:
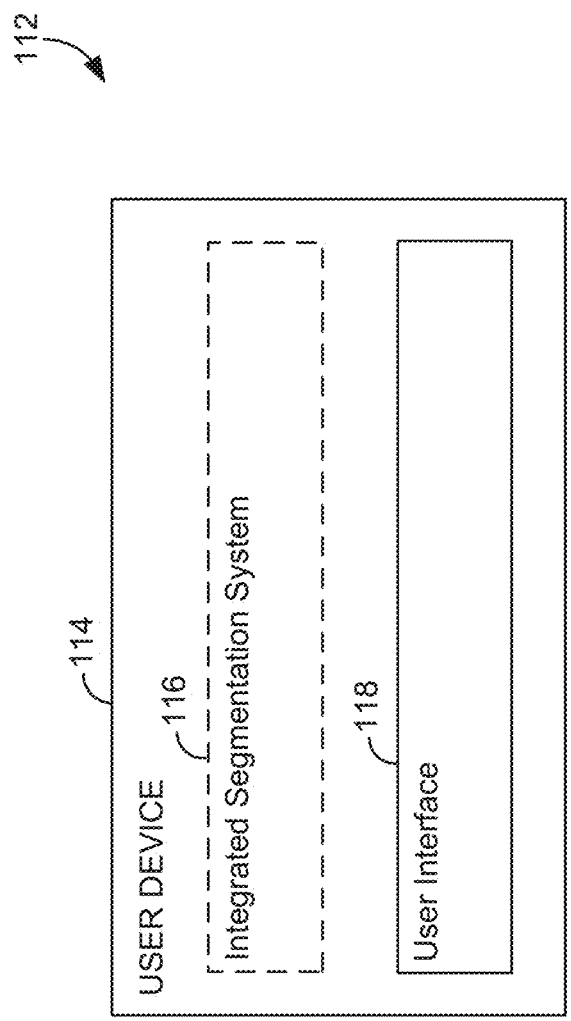
FIG. 1B depicts an example configuration of an operating environment in which some implementations of the present disclosure can be employed, in accordance with various embodiments of the present disclosure.

Referring to FIG. 1B, aspects of an illustrative integrated segmentation system are shown, in accordance with various embodiments of the present disclosure. FIG. 1B depicts a user device 114, in accordance with an example embodiment, configured to allow for performing optimal segmentation of an image by integrating multiple segmentation methods. The user device 114 may be the same or similar to the user device 102a-102n and may be configured to support the integrated segmentation system 116 (as a standalone or networked device). For example, the user device 114 may store and execute software/instructions to facilitate interactions between a user and the integrated segmentation system 116 via the user interface 118 of the user device.

A user device can be utilized by a user to facilitate segmenting an image, presenting the segmentations as segmentation masks, and editing the image using a segmentation mask (e.g., optimized segmentation mask). In particular, a user can select or input an image or picture for segmentation utilizing user interface 118. An image and/or picture can be selected or input in any manner. The user interface may facilitate the user accessing one or more images stored on the user device (e.g., in a photo library), and/or import images from remote devices and/or applications. Based on the input image, the input image can undergo segmentation using various techniques, some of which are further discussed below with reference to integrated segmentation system 204 of FIG. 2, and an optimized segmentation mask can be provided to the user via a user interface. After combining multiple image segmentation methods to generate the optimized segmentation mask, the segmentation mask can be used to edit the image.

Figure 2:
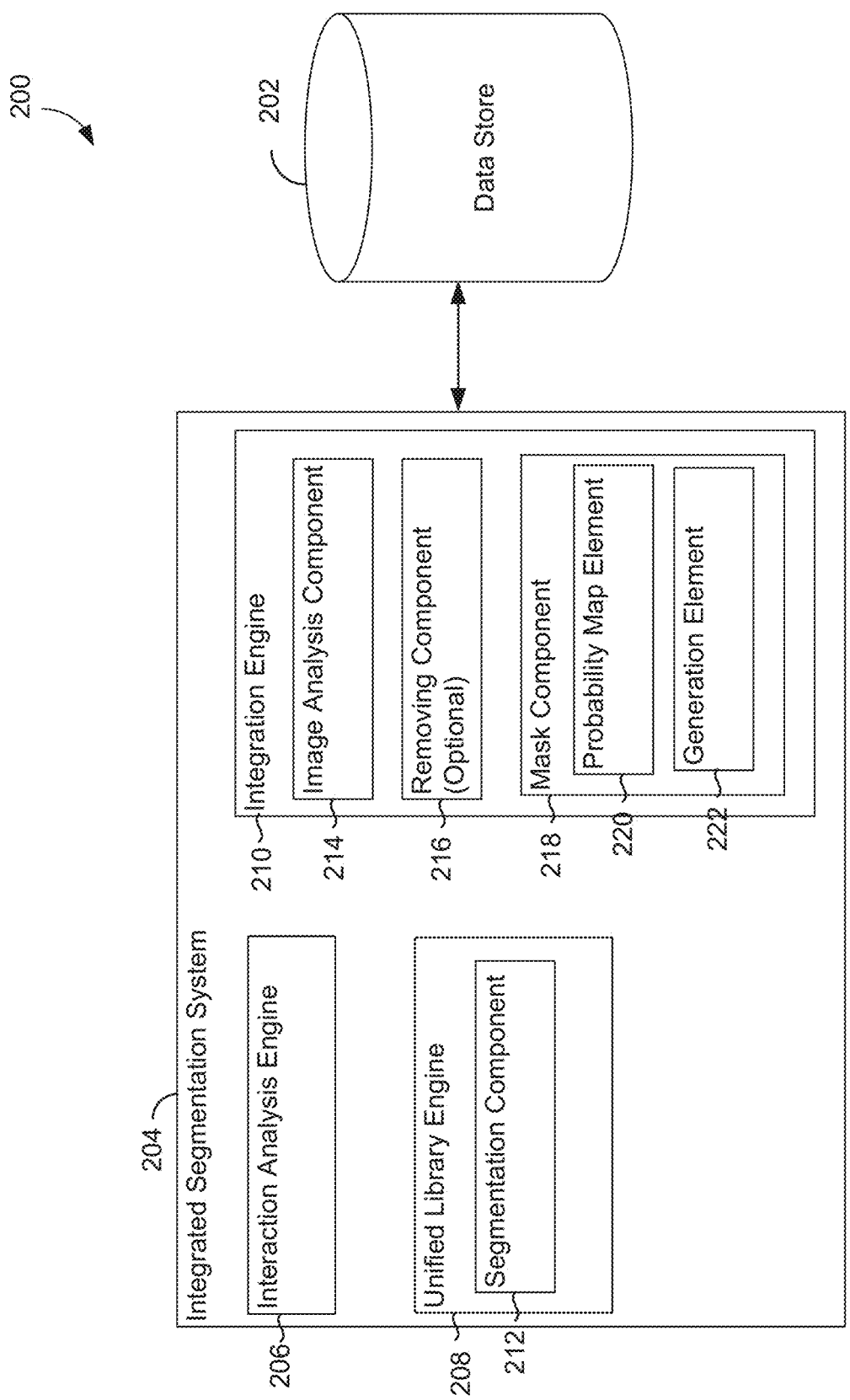
FIG. 2 depicts aspects of an illustrative integrated segmentation system, in accordance with various embodiments of the present disclosure.

Referring to FIG. 2, aspects of an illustrative image segmentation environment 200 are shown, in accordance with various embodiments of the present disclosure. Integrated segmentation system 204 includes interaction analysis engine 206, unified library engine 208, and integration engine 210. The foregoing engines of integrated segmentation system 204 can be implemented, for example, in operating environment 100 of FIG. 1A and/or operating environment 112 of FIG. 1B. In particular, those engines may be integrated into any suitable combination of user devices 102a and 102b through 102n and server(s) 108 and/or user device 114. While interaction analysis engine, unified library engine, and integration engine are depicted as separate engines, it should be appreciated that a single engine could perform the functionality of one or more of the engines. Additionally, in implementations, the functionality of the engines can be performed using additional engines. Further, it should be appreciated that the functionality of unified library engine can be provided by a system separate from the integrated segmentation system (e.g., an image segmentation system).

Such an integrated segmentation system can work in conjunction with data store 202. Data store 202 can store computer instructions (e.g., software program instructions, routines, or services), data, and/or models used in embodiments described herein. In some implementations, data store 202 can store information or data received via the various engines and/or components of integrated segmentation system 204 and provides the various engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data store 202 can be used to store a neural network system capable of being used to perform optimal segmentation of an image by integrating multiple segmentation methods. In particular, such optimal segmentation can be based on deep learning techniques, further discussed below with reference to integration engine 210. Such a neural network system can be comprised of one or more neural networks.

In embodiments, data stored in data store 202 can include images a user can select for segmentation using, for example, the integrated segmentation system. An image can include a visual representation of a person, object, or scene. Examples of an image can include digital versions of a picture, painting, drawing, and/or photograph. Such images can be input into data store 202 from a remote device, such as from a server or a user device. Data stored in data store 202 can also include segmentation masks generated for an image. Such segmentation masks can be stored as multiple segments and/or as masks. Segments can be created along boundaries within an image and/or used to designate objects and/or features within the image. Data stored in data store 202 can further include edited images. Saved edits can include manipulations to an image using a selected segmentations mask to apply edits to the corresponding portion of the image.

Integrated segmentation system 204 can generally be used for segmenting images. Specifically, the integrated segmentation system can be configured for optimal segmentation of an image by integrating multiple segmentation methods. As used herein, image segmentation is the process of partitioning an image into a segmentation mask based on one or more interactions with the image. Such an interactions can be an interactive object selection (e.g., indicating a portion of the image to segment into a segmentation mask). Such a segmentation mask can be used in image editing to selectively apply edits to only the portion of the image as indicated by the interaction (e.g., an interactive object selection).

Interaction analysis engine 206 can receive and analyze interactions with an image. These interactions can be interactive object selections. Such interactive object selection can be based on an interactive action performed by a user. For instance, interactive actions can include clicks, scribbles, drawing a bounding box, and/or speaking a language command. The interactive action can indicate an object, area, and/or portion of an image to include, or exclude, from segmentation. A user can perform an interactive object selection with an image using a graphical user interface (GUI). As an illustrative example, a user can click a dog in an image to indicate that the dog should be included in the segmentation. As another example, a user can utter a spoken language command to indicate that a dog should be included in the segmentation of an image.

In some embodiments, interaction analysis engine 206 can further determine a particular image segmentation method that should be used to segment the image. In some embodiments, a user can select the particular image segmentation method. For example, a user can explicitly select the method by selecting an image segmentation method (e.g., via a graphical user interface interaction). In embodiments, where a user explicitly selects a method, interaction analysis engine 206 can receive a particular image segmentation method that should be used to segment the image. For instance, a user can select tool to use in segmentation that indicates the particular image segmentation method. For example, a user can explicitly select the method by selecting an image segmentation method (e.g., via a graphical user interface interaction). In other embodiments, a user can implicitly select the method (e.g., the method can be selected based on the interactive object selection).

From the received interactive object selection, the integrated segmentation system can run a particular image segmentation method. In some embodiments, interaction analysis engine 206 can analyze the received interactive object selection to determine a particular image segmentation method that should be used to segment the image. For instance, the method can be selected based on the interactive object selection. As an example, if the interactive object selection is a spoken language command, the selected image segmentation method can be a language-based segmentation method (e.g., PhraseCut). In some instances, a trained neural network can be used to determine the particular image segmentation method that should be used to segment the image.

Once a particular image segmentation method is selected for use in segmenting an image (e.g., using interaction analysis engine 206), unified library engine 208 can run the image segmentation method. The unified library engine 208 can comprise any number of image segmentation methods. Such image segmentation methods can be implemented using techniques that include deep learning techniques, color range or saliency detection, thresholding, clustering methods, compression-based methods, histogram-based methods, edge detection, dual clustering methods, region-growing methods, partial differential equation-based methods, variational methods, graph partitioning methods, watershed transformation, model based segmentation, multi-scale segmentation, and semi-automatic segmentation. Specifically, the deep learning techniques can include instance-level semantic segmentation, automatic boundary-aware human cutout, object detection using cascaded CNNs, generic algorithms for segmentation, etc.

As shown, the unified library engine 208 can include segmentation component 212. The foregoing component of unified library engine 208 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. It should be appreciated that while the segmentation component is depicted as a single component, in implementations, the functionality of the component can be performed using a one or more additional components.

Generally, the segmentation component 212 can be configured to perform image segmentation methods. In particular, the segmentation component can perform the particular image segmentation method that is selected for use in segmenting an image (e.g., using interaction analysis engine 206). In performing an image segmentation method, segmentation component 212 can generate a probability distribution map based on a received image and interactive object selection related to the image. A probability distribution map can generally be the output of the segmentation method (e.g., segmentation mask, heat map, etc.). For instance, the probability distribution map can be information generated by a segmentation method when segmenting an image. From this probability distribution map, a segmentation mask can be generated.

An image can be accessed or referenced by segmentation component 212 for segmentation. In this regard, the segmentation component 212 may access or retrieve an image selected by a user via data store 202 and/or from a remote device, such as from a server or a user device. As another example, the segmentation component 212 may receive an image provided to the integrated segmentation system 204 via a user device.

Upon running an image segmentation method for an image (e.g., using segmentation component 212), integration engine 210 can be utilized to obtain optimal segmentation of the image by integrating multiple segmentation methods. For instance, an optimal segmentation can be generated by iteratively integrating a previous segmentation (e.g., using an image segmentation method performed by segmentation component 212) with a current segmentation (e.g., using the same or different image segmentation method performed by segmentation component 212). As an example, as a user interacts with an image, the integration engine 210 can integrate previous segmentation method(s) into the current image segmentation.

In embodiments, the integration engine 210 can use one or more neural networks based on a convolutional recurrent neural network (RNN) architecture. For instance, the integration engine 210 can implement a convolutional RNN to maintain information when transitioning from one segmentation method to another segmentation such that multiple interactive image segmentation methods can be assimilated into an integrated image segmentation process.

Integration engine 210 can be used to train the convolutional RNN to integrate information related to a previous segmentation(s) into a current segmentation. The convolutional RNN can be trained using various interactive image segmentation methods. In one embodiment, two image segmentation methods can be used to train the convolutional RNN (e.g., PhraseCut and DIOS). For instance, when a spoken language command is received, a language-based segmentation method (e.g., PhraseCut) can be used. When a click is received, a click-based segmentation method (e.g., DIOS) can be used.

Initially, to train the convolutional RNN, a first segmentation method can be performed on an image. To perform the first segmentation method, an interactive object selection can be received that indicates which segmentation should be used (e.g., a spoken language command for PhraseCut and a click for DIOS). The first segmentation method can then be run to generate a probability distribution map. This probability distribution map can be fed into the convolutional RNN along with the image. The convolutional RNN can store a hidden state related to the first segmentation method and output an updated probability mask. Loss between the updated probability mask and a ground-truth mask can be used to update the convolutional RNN. For instance, pixel loss can be used.

Integration engine 210 can also use one or more classifier neural networks. For instance, integration engine 210 can implement a classifier neural network that can generate a segmentation mask from the updated probability distribution map. Such a classifier neural network can receive a feature (e.g., in the form of the updated probability distribution map) and generate a final output (e.g., in the form of an optimal segmentation mask). For instance, the classifier neural network can include a decoder portion that can take the feature in a feature space that is not interpretable by a human and convert the feature back into an image state.

In some embodiments, integration engine 210 can train the classifier neural network to combine the features from the feature map combined with the current probability distribution map and the feature map combined with the previous probability distribution map. For instance, in embodiments where the convolutional RNN does not have any knowledge of the image segmentation method used, the classifier neural network can use this information to intelligently combine a first feature (e.g., the combination of the feature map and the current probability distribution map) related to a first image segmentation method with a second feature (e.g., the combination of the feature map and the previous probability distribution map) related to a second image segmentation method. As an example, if the first image segmentation method is more accurately related to the interior of objects but is not as accurate for edges, and the second image segmentation method is less accurately related to the interior of objects but is more accurate for edges, the classifier neural network can combine the first and second features accordingly (e.g., favoring portions related to the more reliable/accurate methods).

As shown, the integration engine 210 can include image analysis component 214, removing component 216, and mask component 218. The foregoing components of integration engine 210 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. It should be appreciated that while the image analysis component, the removing component, and the mask component are depicted as a separate components, in implementations, the functionality of the engine can be performed using a single component and/or additional components. In addition, in some embodiments, removing component 216 and its associated functionality are optional and can be excluded from integration engine 210.

Generally, the image analysis component 214 can be configured to analyze an image. In particular, image analysis component 214 can be used to determine features of the image. In an embodiment, such an analysis can be performed using, for example, a neural network. Such a neural network can be based on a convolutional RNN architecture. For instance, a convolutional RNN can be used to determine a feature map for an image. This feature map can indicate the features of the image. Such a feature map can be helpful in segmenting the image based on a selected/unselected object. For instance, if an interaction input indicates a cat should be included in a segmentation, representations of the feature map related to the cat can be used to aid in generating a segmentation mask that contains the cat.

Removal component 216 can be used in instances where the interactive object selection indicates that an object, feature, or portion of an image should be excluded from a desired segmentation mask. The removal component can incorporate the removal information from an interactive object selection (e.g., received and/or analyzed by interaction analysis engine 206) into the convolutional RNN such that the object, feature, or portion of the image that should be excluded from a desired segmentation mask can be tracked. In particular, after the convolutional RNN determines a feature map for an image (e.g., using image analysis component 214), the removal component 216 can incorporate the removal information into the feature map. For example, if the interactive object selection indicates removal of an object, then information related to the object can be removed from the determined feature map.

Generally, the mask component 218 is configured to generate a segmentation mask for an image in accordance with optimal segmentation by integrating multiple segmentation methods. For instance, an optimal segmentation mask can be generated by iteratively integrating a previous segmentation (e.g., using an image segmentation method) with a current segmentation (e.g., using the same or different image segmentation method). The mask component 218 can use the convolutional RNN to integrate information related to a previous segmentation(s) when performing a current segmentation. In particular, the mask component 218 can receive and combine information related to a previous segmentation of an image with information related to a current segmentation of the image.

As shown, the mask component 218 can include probability map element 220 and generation element 222. The foregoing elements of mask component 218 can be implemented, for example, in operating environment 100 of FIG. 1A and/or operating environment 112 of FIG. 1B. In particular, those elements may be integrated into any suitable combination of user devices 102a and 102b through 102n and server(s) 106 and/or user device 114. It should be appreciated that while the probability map element and the generation element are depicted as separate elements, in implementations, the functionality of the elements can be performed using a single element and/or additional elements.

Probability map element 220 can be used to integrate information related to a previous segmentation(s) when performing a current segmentation. Such information can comprise at least a probability distribution map. A probability distribution map can generally be the output of a segmentation method (e.g., segmentation mask, heat map, etc.). A probability distribution map from a current image segmentation method can be received, for example, from segmentation component 212. Upon receiving a probability distribution map, the convolutional RNN can generate a hidden state based on the information related to the probability distribution map.

Subsequently, when a subsequent segmentation method is used to segment the image (e.g., using segmentation component 212), a current probability distribution map can be received by probability map element 220. Probability map element 220 can update the current probability distribution map using the hidden state of the convolutional RNN (e.g., the hidden state based on a probability distribution map related to a previous image segmentation method). Probability map element 220 can generate an updated probability distribution map that incorporates the information related to a previous segmentation into the current segmentation.

The convolutional RNN can generally be employed as follows to update a hidden state (e.g., $S_t$), updated probability distribution map (e.g., $Y_t$) and current segmentation mask (e.g., $M_t$).

$$S_t = \sigma(w_s \cdot P_t \cdot u_s \cdot S_{t-1} + b_s)$$

$$Y_t = \sigma(w_Y \cdot S_t + b_Y)$$

$$M_{t,(x,y)} = \begin{cases} 0, & Y_t, (x, y) < \text{threshold} \\ 1, & Y_t, (x, y) \geq \text{threshold} \end{cases}$$

In such equations, $w_s$ and $u_s$ can be learnable convolution parameters and $b_s$ can be bias. $\sigma(x)=1/(1+e^{-x})$ can be a sigmoid function. In each stage, the hidden state can be updated according to the previous state (e.g., $S_{t-1}$) and the new probability map (e.g., $P_t$).

Generation element 222 can use the resulting updated probability distribution map to generate an updated segmentation mask (e.g. that incorporates the previous segmentation and the current segmentation). The segmentation mask can be presented to a user in various manners. Generation element 222 can run the classifier neural network to generate a segmentation mask from the updated probability distribution map.

Figure 3:
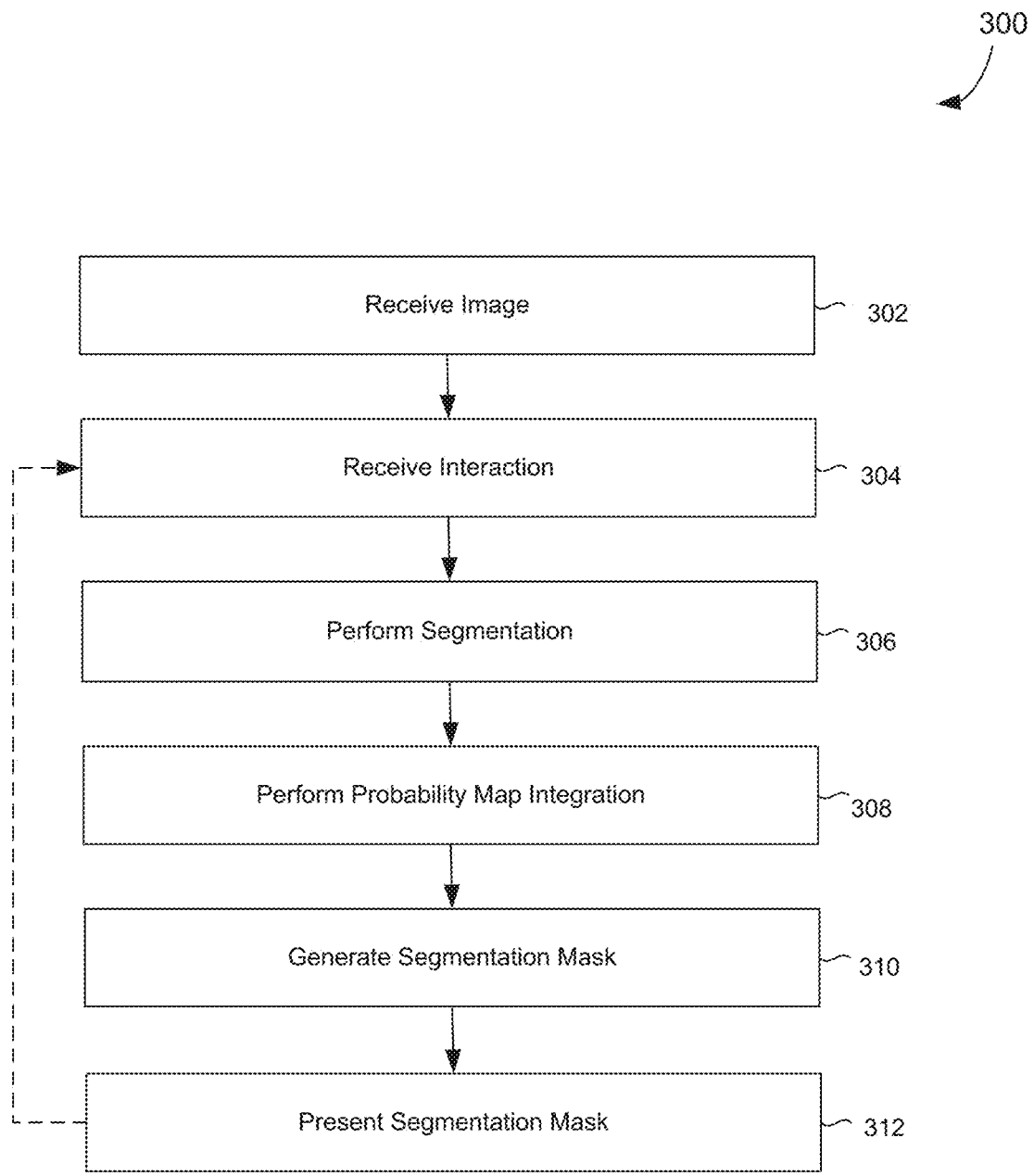
FIG. 3 illustrates a process flow showing an embodiment for performing multiple segmentation method integration, in accordance with embodiments of the present disclosure.

With reference to FIG. 3, a process flow is provided showing an embodiment of method 300 for performing multiple segmentation method integration, in accordance with embodiments of the present disclosure. Method 300 can be performed, for example by integrated segmentation system 204, as illustrated in FIG. 2.

At block 302, an image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

At block 304, an interaction is received. The interaction can be an interactive object selection of an image by a user. Such interactive object selection can be based on an interactive action (e.g., click, scribble, bounding box, and/or language). Based on the received interactive object selection, an image segmentation method can be selected for use in segmenting the image (e.g., received at block 302). In some embodiments, a user can select the particular image segmentation method. For example, a user can explicitly select the method by selecting an image segmentation method (e.g., via a graphical user interface interaction). In other embodiments, the image segmentation method that is used to segment the image is based on the received interaction. In this way, a user can implicitly select the method (e.g., the method can be selected based on the interactive object selection).

At block 306, segmentation of the image is performed. Image segmentation is the process of partitioning an image into at least one segment. In particular, a segment can be created along boundaries within an image and/or used to designate objects and/or features within the image. For instance, when a segmentation method is used to segment the image, a probability distribution map can be generated. A probability distribution map can generally be the output of the segmentation method (e.g., segmentation mask, heat map, etc.). For instance, the probability distribution map can be information generated by a segmentation method when segmenting an image.

Such segmentation can be performed using any number of techniques. Such techniques include deep learning techniques, color range or saliency detection, thresholding, clustering methods, compression-based methods, histogram-based methods, edge detection, dual clustering methods, region-growing methods, partial differential equation-based methods, variational methods, graph partitioning methods, watershed transformation, model based segmentation, multi-scale segmentation, and semi-automatic segmentation. Specifically, the deep learning techniques can include instance-level semantic segmentation, automatic boundary-aware human cutout, object detection using cascaded convolutional neural networks, generic algorithms for segmentation such as R-CNN and/or mask R-CNN.

At block 308, probability map integration is performed. Probability map integration is the process of combining a previous probability distribution map (e.g., from a previous segmentation method) with a current probability distribution map (e.g., from a current segmentation method).

In particular, a convolutional RNN can be used to receive information related to the previous probability distribution map. Using this information, the convolutional RNN can generate a hidden state based on the information related to the previous probability distribution map. Subsequently, when the current segmentation method is used to segment the image, the current probability distribution map (e.g., determined using the current segmentation method) can be updated using this hidden state to generate an updated probability distribution map. In this way, the hidden state of the convolutional RNN can be used to incorporate information related to a previous segmentation into a current segmentation.

At block 310, a segmentation mask is generated. The generated segmentation mask can be generated using the resulting updated probability distribution map. The segmentation mask can incorporate the previous segmentation and the current segmentation.

At block 312, the segmentation mask can be presented. Presentation of the segmentation mask allows a user to see and visualize the segmented area(s) of an image. The user can further interact with the image and displayed segmentation mask using additional interactive object selection(s). Such an interactive object selection can indicate further refinements that the user desires to have made to the displayed segmentation mask. From these additional interactive object selection(s), an updated segmentation mask (e.g., optimized segmentation mask) can be displayed to the user.

Figure 4:
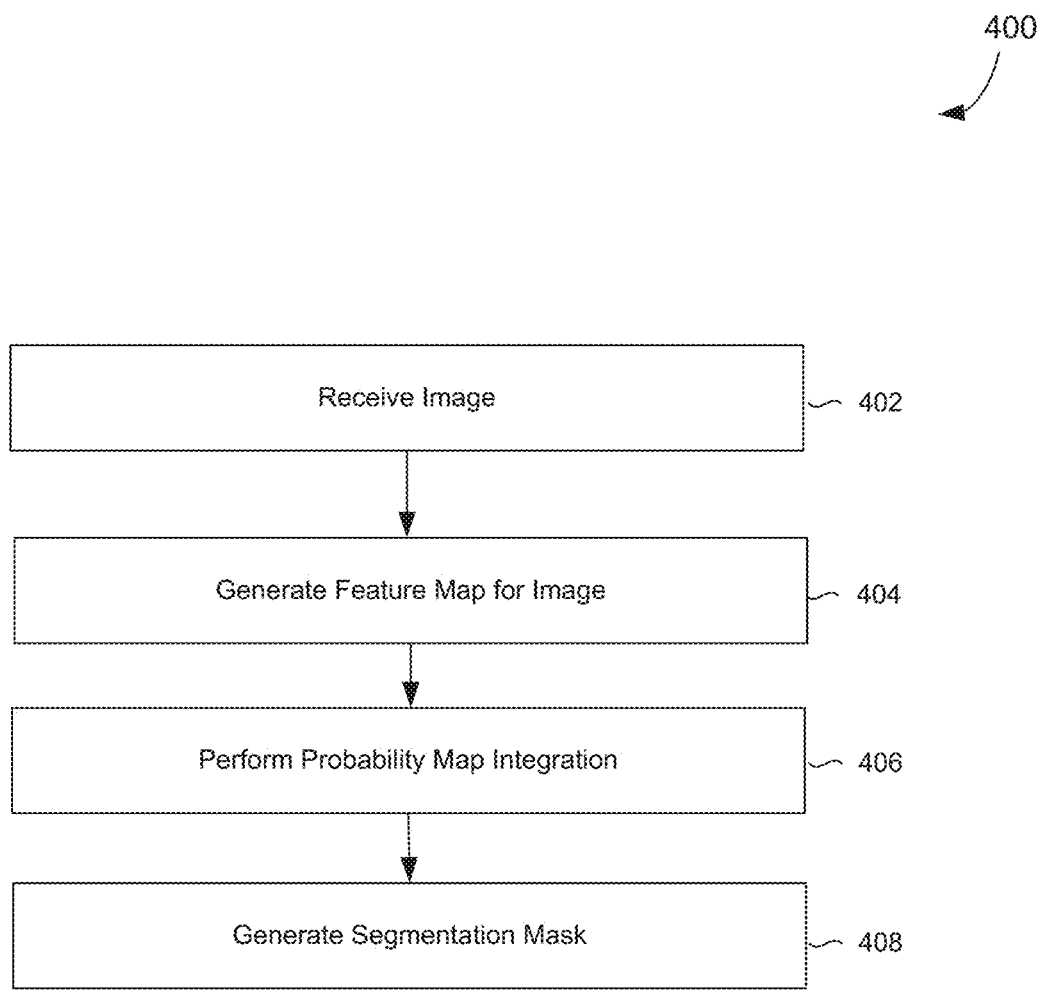
FIG. 4 illustrates a process flow showing an embodiment integrating multiple segmentation methods, in accordance with embodiments of the present disclosure.

With reference to FIG. 4, a process flow is provided showing an embodiment of method 400 for integrating multiple segmentation methods, in accordance with embodiments of the present disclosure. Method 400 can be performed, for example by integrated segmentation system 204, as illustrated in FIG. 2.

At block 402, an image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device. At block 404, a feature map is generated for an image (e.g., the image received at block 402). Such a feature map can generally relate to information regarding objects, individual features, and/or portions of an image. This feature map can be generated using a convolutional RNN.

At block 406, probability map integration is performed. A probability distribution map can generally be the output of the segmentation method (e.g., segmentation mask, heat map, etc.). Probability map integration is the process of combining a previous probability distribution map (e.g., from a previous segmentation method) with a current probability distribution map (e.g., from a current segmentation method). In particular, the feature map of the image can be combined with a current probability distribution map (e.g., from a current segmentation method) and a previous probability distribution map (e.g., from a previous segmentation method). For instance, the feature map can be combined with the current probability distribution map to generate a first feature (e.g., the combination of the feature map and the current probability distribution map). Further, the feature map can be combined with the previous probability distribution map to generate a second feature (e.g., the combination of the feature map and the previous probability distribution map). The first and second feature can then be concatenated. This concatenated first and second feature can be used to generate an updated probability distribution map. The updated probability distribution map incorporates information related to the current segmentation method and the previous segmentation method.

In more detail, probability map integration can be performed by the convolutional RNN receiving information related to the previous probability distribution map. Using this information, the convolutional RNN can generate a hidden state based on the information related to the previous probability distribution map. Subsequently, when a subsequent segmentation method (e.g., current segmentation method) is used to segment the image, the current probability distribution map (e.g., determined using the subsequent segmentation method) can be updated using this hidden state to generate an updated probability distribution map. In this way, the hidden state of the convolutional RNN can be used to incorporate information related to a previous segmentation into a current segmentation.

At block 408, a segmentation mask is generated. In particular, the updated probability distribution map can then be used to generate a segmentation mask (e.g. that incorporates the previous segmentation and the current segmentation). A user can further interact with the image and generated segmentation mask using additional interactive object selection(s). Such an interactive object selection can indicate further refinements that the user desires to have made to the segmentation mask. From these additional interactive object selection(s), an optimized segmentation mask can be generated.

Figure 5:
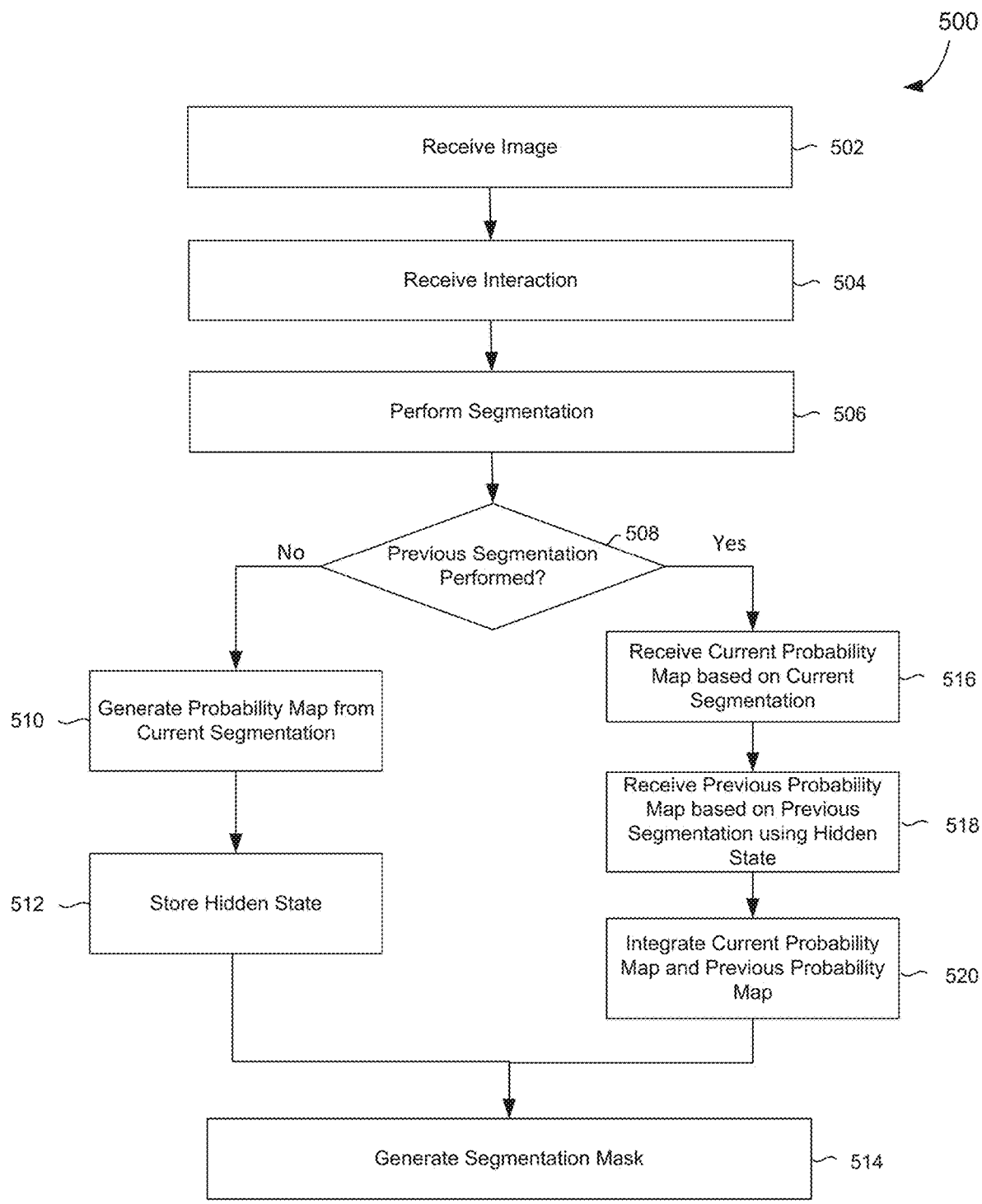
FIG. 5 illustrates a process flow showing an embodiment for integrating multiple segmentation methods to generate an optimized segmentation mask, in accordance with embodiments of the present disclosure.

With reference to FIG. 5, a process flow is provided showing an embodiment of method 500 for integrating multiple segmentation methods to generate an optimized segmentation mask, in accordance with embodiments of the present disclosure. Method 500 can be performed, for example by integrated segmentation system 204, as illustrated in FIG. 2.

At block 502, an image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

At block 504, an interaction is received. The interaction can be an interactive object selection of an image by a user. Such interactive object selection can be based on an interactive action (e.g., click, scribble, bounding box, and/or language). Based on the received interactive object selection, an image segmentation method can be selected for use in segmenting the image (e.g., received at block 502). In some embodiments, a user can select the particular image segmentation method. For example, a user can explicitly select the method by selecting an image segmentation method (e.g., via a graphical user interface interaction). In other embodiments, the image segmentation method that is used to segment the image is based on the received interaction. In this way, a user can implicitly select the method (e.g., the method can be selected based on the interactive object selection).

At block 506, segmentation of the image is performed. Image segmentation is the process of partitioning an image into a segment. In particular, a segment can be created along boundaries within an image and/or used to designate objects and/or features within the image. For instance, segmentation of the image can generate a probability distribution map. A probability distribution map can generally be the output of the segmentation method (e.g., segmentation mask, heat map, etc.). Such segmentation can be performed using any number of techniques. Such techniques include deep learning techniques, color range or saliency detection, thresholding, clustering methods, compression-based methods, histogram-based methods, edge detection, dual clustering methods, region-growing methods, partial differential equation-based methods, variational methods, graph partitioning methods, watershed transformation, model based segmentation, multi-scale segmentation, and semi-automatic segmentation. Specifically, the deep learning techniques can include instance-level semantic segmentation, automatic boundary-aware human cutout, object detection using cascaded convolutional neural networks, generic algorithms for segmentation such as R-CNN and/or mask R-CNN.

At block 508, a determination is made whether a previous segmentation has be performed on an image. If there has not been a previous segmentation then the process can proceed to block 510. If there has been a previous segmentation then the process can proceed to block 516, described in further detail below.

At block 510, a probability distribution map is generated from a current segmentation. A probability distribution map can generally be the output of the segmentation method (e.g., segmentation mask, heat map, etc.). At block 512, a hidden state is stored. In particular, a convolutional RNN can receive information related to the probability distribution map. Using this information, the convolutional RNN can generate a hidden state. This hidden state can be used to maintain information related to the probability distribution map. By maintaining this information, the convolutional RNN can combine the information about the probability distribution map with subsequently generated probability distribution maps (e.g., integrating a pervious image segmentation method with a subsequent image segmentation method).

At block 514, a segmentation mask is generated. The generated segmentation mask can be generated using the probability distribution map. A user can further interact with the image using additional interactive object selection (e.g., with a subsequent interaction at block 504). Such an interactive object selection can indicate further refinements that the user desires to have made to the displayed segmentation mask. From these additional interactive object selection(s), an updated segmentation mask can be generated (e.g., optimized segmentation mask) as further discussed with reference to blocks 516-520.

At block 516, a current probability distribution map is received. The current probability map can be based on the current segmentation. At block 518, a previous probability distribution map is received. The previous probability distribution map can be based on a previous segmentation. For instance, the previous probability distribution map can be received using a hidden state. In particular, a convolutional RNN can be used to receive information related to the previous probability distribution map. Using this information, the convolutional RNN can generate a hidden state based on the information related to the previous probability distribution map.

At block 520, the current probability distribution map is integrated with the previous probability distribution map. In particular, a current probability distribution map (e.g., determined using a current segmentation method) can be updated using a hidden state to generate an updated probability distribution map. In this way, the hidden state of the convolutional RNN can be used to incorporate information related to a previous segmentation into a current segmentation.

At block 514, a segmentation mask is generated. In particular, the resulting updated probability distribution map can then be used to generate an updated segmentation mask (e.g. that incorporates the previous segmentation and the current segmentation). The generated segmentation mask can be presented to a user. Presentation of the segmentation mask allows a user to see and visualize the segmented area(s) of an image. As discussed previously, the user can further interact with the image and displayed segmentation mask using additional interactive object selection(s).

Figure 6:
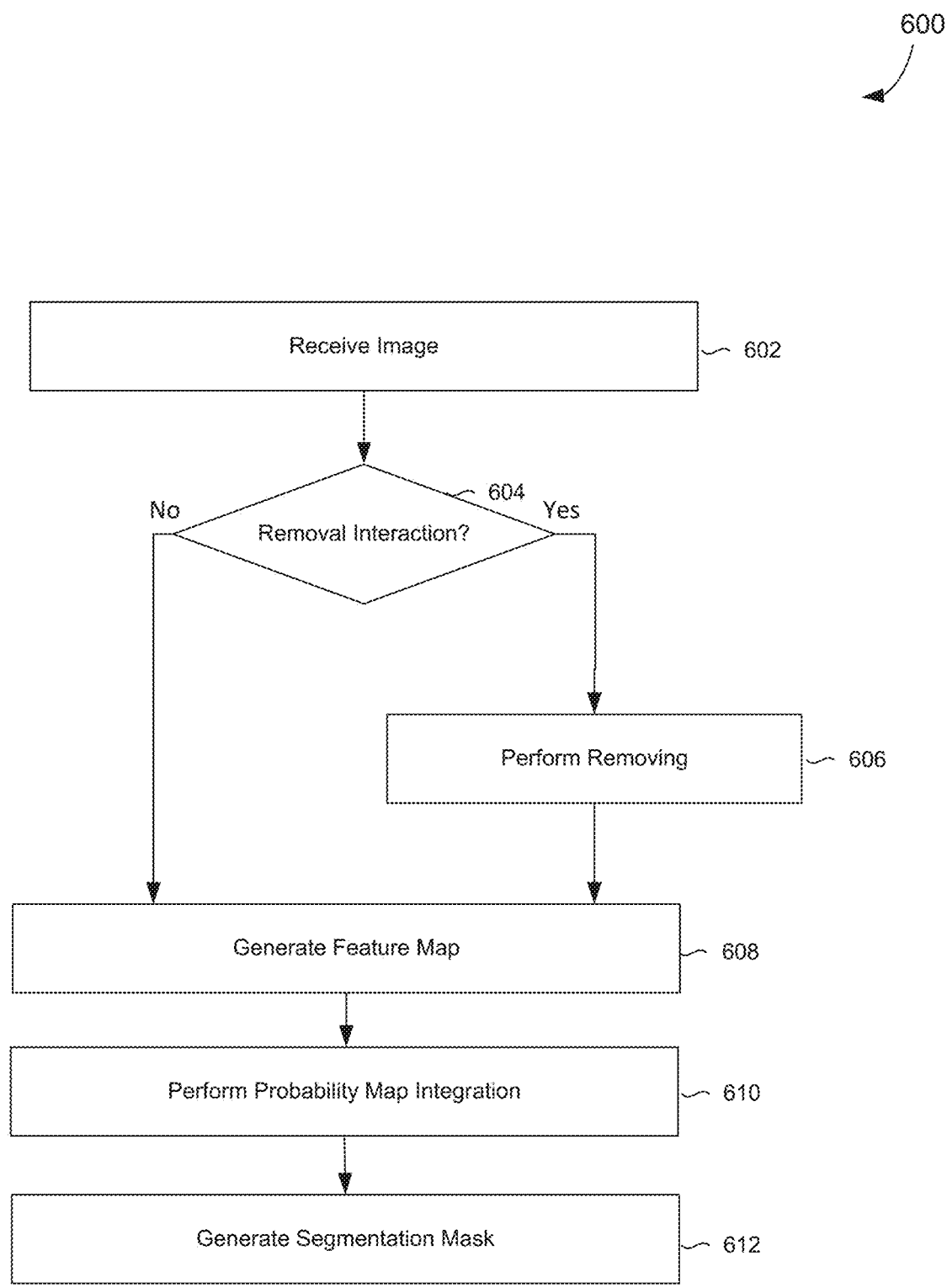
FIG. 6 illustrates a process flow showing an embodiment for integrating multiple segmentation methods that include removal segmentation methods, in accordance with embodiments of the present disclosure.

With reference to FIG. 6, a process flow is provided showing an embodiment of method 600 for integrating multiple segmentation methods that include removal segmentation methods, in accordance with embodiments of the present disclosure. Method 600 can be performed, for example by integrated segmentation system 204, as illustrated in FIG. 2.

At block 602, an image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

At block 604, a determination is made whether there is a removal interaction. A removal interaction can be an interactive object selection that indicates that an object, feature, or portion of an image should be excluded from a desired segmentation mask. When there is a removal interaction, the process can proceed to block 606. When there is not a removal interaction, the process can proceed to block 608.

At block 606, removing is performed. Removing can be performed by incorporating removal information into a convolutional RNN such that the system keeps track of what object, feature, or portion of an image should be excluded from a desired segmentation mask.

At block 608, a feature map is generated. Such a feature map can generally relate to information regarding objects, features, and/or portions of an image. This feature map can be generated using a convolutional RNN. When removing is performed at block 606, the feature map can incorporate the removal information (e.g., from block 606). For example, if the interactive object selection indicates removal of an object, then information related to the object can be removed from the feature map.

At block 610, probability map integration is performed. A probability distribution map can generally be the output of the segmentation method (e.g., segmentation mask, heat map, etc.). Probability map integration is the process of combining a previous probability distribution map (e.g., from a previous segmentation method) with a current probability distribution map (e.g., from a current segmentation method). For instance, the feature map (e.g., with information related to the object removed when removing occurs at block 606) can be combined with a current probability distribution map (e.g., from a current segmentation method) and a previous probability distribution map (e.g., from a previous segmentation method).

In particular, a convolutional RNN can be used to receive information related to the previous probability distribution map. Using this information, the convolutional RNN can generate a hidden state based on the information related to the previous probability distribution map. Subsequently, when a subsequent segmentation method (e.g., current segmentation method) is used to segment the image, the current probability distribution map (e.g., determined using the subsequent segmentation method) can be updated using this hidden state to generate an updated probability distribution map. In this way, the hidden state of the convolutional RNN can be used to incorporate information related to a previous segmentation into a current segmentation. The resulting updated probability distribution map can then be used to generate an updated segmentation mask (e.g. that incorporates the previous segmentation and the current segmentation).

At block 612, a segmentation mask is generated. The generated segmentation mask can be presented to a user. Presentation of the segmentation mask allows a user to see and visualize the segmented areas of an image. A user can further interact with the image and generated segmentation mask using additional interactive object selection(s). Such an interactive object selection can indicate further refinements that the user desires to have made to the segmentation mask. From these additional interactive object selection(s), an optimized segmentation mask can be generated.

Figure 7:
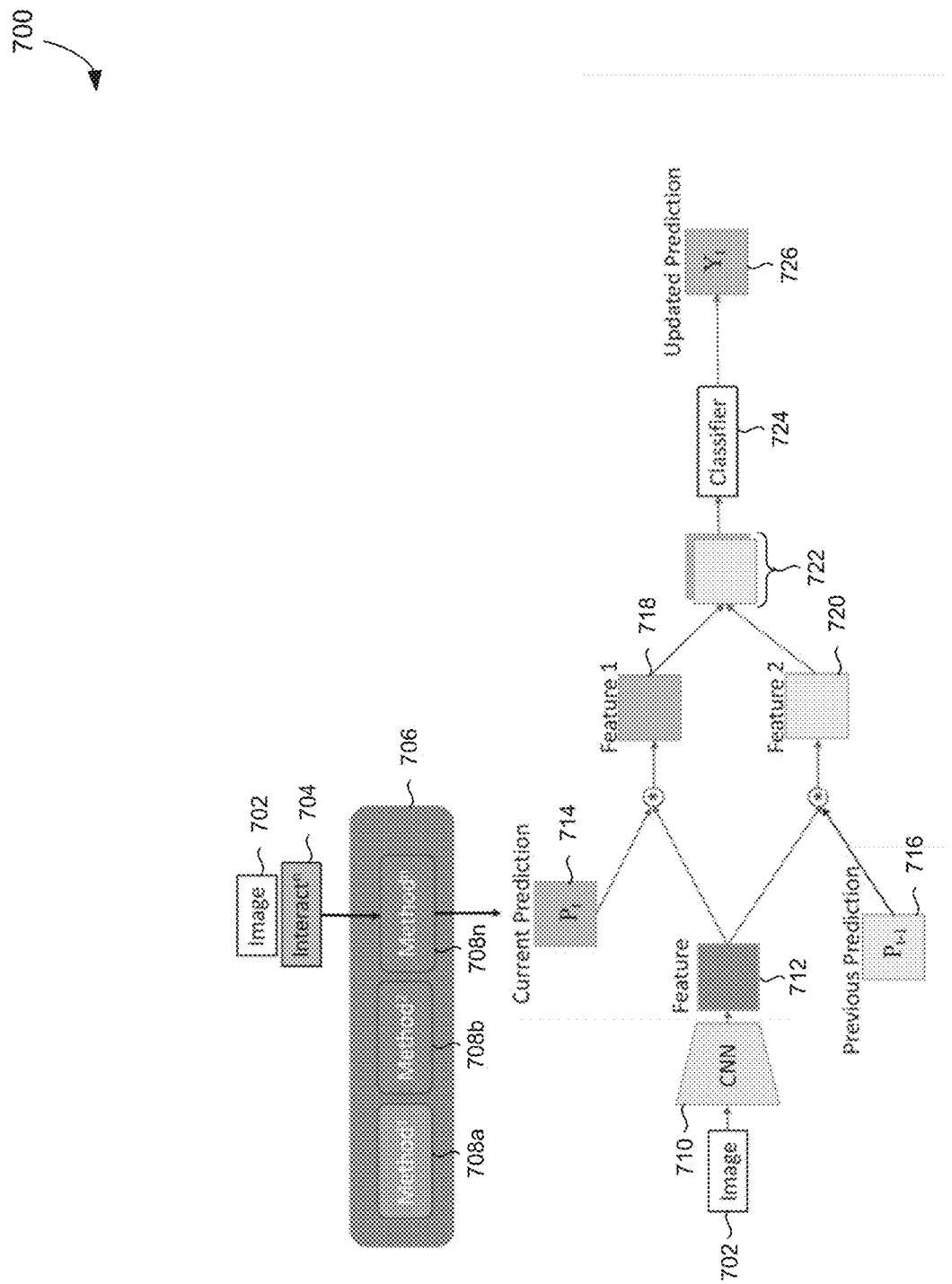
FIG. 7 illustrates an example environment that can be used for integrating information related to a previous segmentation(s) when performing a current segmentation, in accordance with embodiments of the present disclosure.

FIG. 7 illustrates an example environment 700 that can be used for integrating information related to a previous segmentation(s) when performing a current segmentation, in accordance with embodiments of the present disclosure. In particular, a convolutional RNN can be used to integrate this information. The convolutional RNN can combine the previous segmentation(s) with the current segmentation without requiring any information about the image segmentation method(s) used to generate the segmentations.

Image 702 can be received for segmentation. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

Various image segmentation methods (e.g., method 708*a*, method 708*b*, . . . , method 708*n*) can be integrated in unified library 706. This unified library allows various image segmentation methods to build upon one another in response to interactions indicating a desired segmentation for an image (e.g., click, swipe, bounding box).

Interaction 704 can be received. The interaction can be an interactive object selection of an image by a user. Such interactive object selection can be based on an interactive action (e.g., click, scribble, bounding box, and/or language). Based on the received interactive object selection, an image segmentation method (e.g., method 708*a*, method 708*b*, . . . , method 708*n*) can be selected for use in segmenting image 702. In some embodiments, a user can select the image segmentation method (e.g., method 708*n*). For example, a user can explicitly select the method by selecting method 708*n* (e.g., via a graphical user interface interaction). In other embodiments, the image segmentation method that is used to segment the image is based on interaction 704. In this way, a user can implicitly select method 708*n* (e.g., based on the interactive object selection).

Method 708*n* can be used to segment image 702 based on interaction 704. From this segmentation, current probability distribution map 714 can be generated. A probability distribution map can generally be the output of a segmentation method (e.g., segmentation mask, heat map, etc.).

Image 702 can also be input into CNN 710. CNN 710 can be a convolutional recurrent neural network that is used to integrate information related to a previous segmentation(s) when performing a current segmentation. From image 702, CNN 710 can generate feature map 712. Feature map 712 can generally relate to information regarding objects, features, and/or portions of image 702.

CNN 710 can receive current probability distribution map 714 from unified library 706. CNN 710 can also have information related to previous probability distribution map 716. This information related to previous probability distribution map 716 can be stored as a hidden state of CNN 710. CNN 710 can combine current probability distribution map 714 and previous probability distribution map 716 with feature map 712. In particular, CNN 710 can combine current probability distribution map 714 with feature map 712 to generate first feature 718. CNN 710 can also combine previous probability distribution map 716 with feature map 712 to generate second feature 720. First feature 718 and second feature 720 can be concatenated to generate updated feature 722. Updated feature 722 can be input into classifier 724. Classifier 724 can be a classifier neural network that can generate a segmentation mask from the updated feature 722. For instance, the classifier neural network can include a decoder portion that can take the feature in a feature space that is not interpretable by a human and convert the feature back into an image state. In this way, classifier 724 can generate updated segmentation mask 726.

Figure 8:
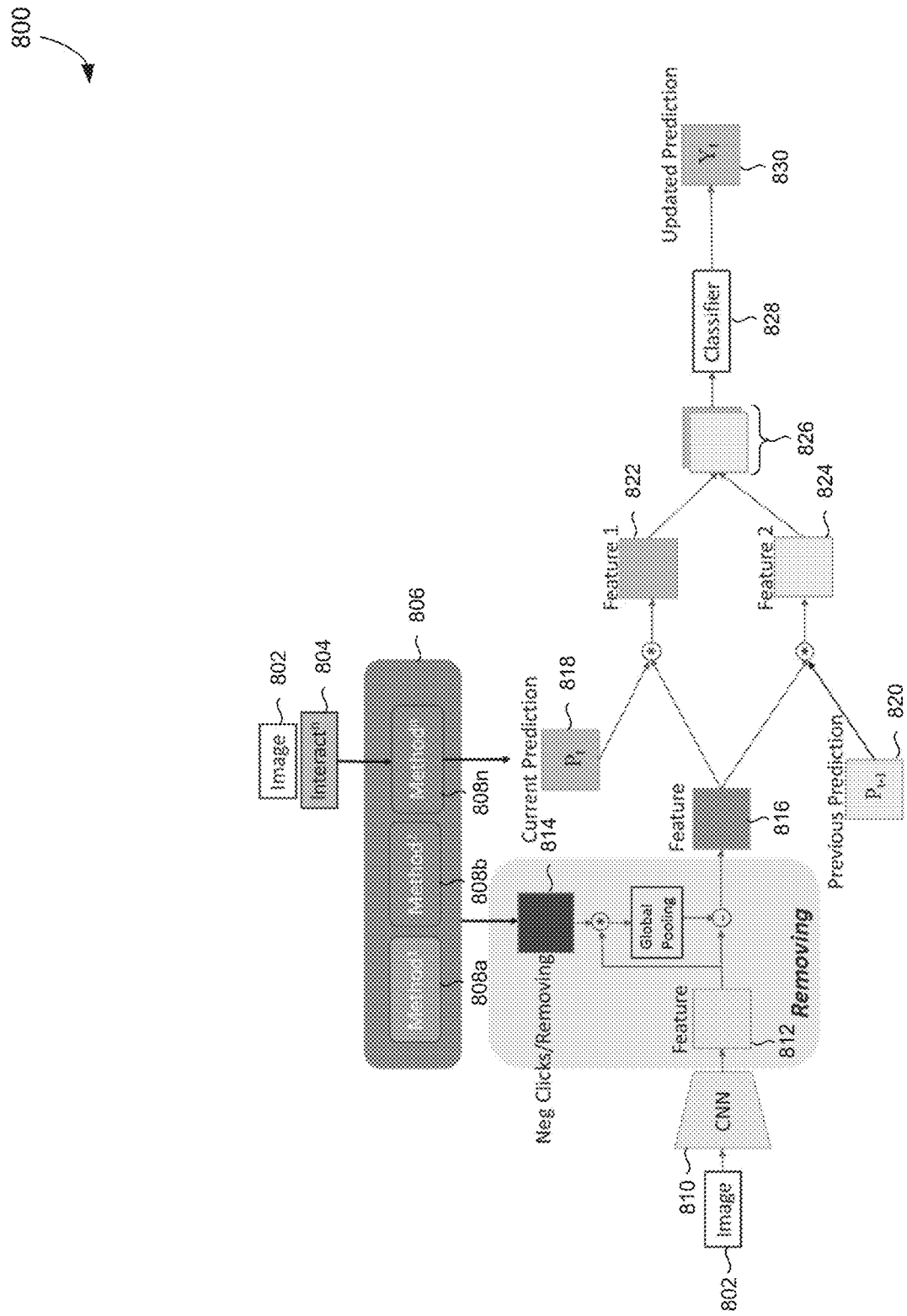
FIG. 8 illustrates an example environment that can be used for integrating information related to a previous segmentation(s) when performing a current segmentation that includes a removing action, in accordance with embodiments of the present disclosure.

FIG. 8 illustrates an example environment 800 that can be used for integrating information related to a previous segmentation(s) when performing a current segmentation that includes a removing action, in accordance with embodiments of the present disclosure. In particular, a convolutional RNN can be used to integrate this information. The convolutional RNN can combine the previous segmentation(s) with the current segmentation without requiring any information about the image segmentation method(s) used to generate the segmentations.

Image 802 can be received for segmentation. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

Various image segmentation methods (e.g., method 808*a*, method 808*b*, . . . , method 808*n*) can be integrated in unified library 806. This unified library allows various image segmentation methods to build upon one another in response to interactions indicating a desired segmentation for an image (e.g., click, swipe, bounding box).

Interaction 804 can be received. The interaction can be an interactive object selection of an image by a user. Such interactive object selection can be based on an interactive action (e.g., click, scribble, bounding box, and/or language). Based on the received interactive object selection, an image segmentation method (e.g., method 808a, method 808b, ..., method 808n) can be selected for use in segmenting image 802. In some embodiments, a user can select the image segmentation method (e.g., method 808n). For example, a user can explicitly select the method by selecting method 808n (e.g., via a graphical user interface interaction). In other embodiments, the image segmentation method that is used to segment the image is based on interaction 804. In this way, a user can implicitly select method 808n (e.g., based on the interactive object selection).

Method 808n can be used to segment image 802 based on interaction 804. From this segmentation, current probability distribution map 818 can be generated. A probability distribution map can generally be the output of a segmentation method (e.g., segmentation mask, heat map, etc.).

Image 802 can also be input into CNN 810. CNN 810 can be a convolutional recurrent neural network that is used to integrate information related to a previous segmentation(s) when performing a current segmentation. From image 802, CNN 810 can generate feature map 812. Feature map 812 can generally relate to information regarding objects, features, and/or portions of image 802.

When interaction 804 indicates that an object, feature, or portion of an image should be excluded (e.g., removed) from a desired segmentation mask, removal 814 can be incorporated into CNN 810. Removal 814 can incorporate the removal information from interaction 804 into the CNN 810 such that the object, feature, or portion of image 802 that should be excluded from a desired segmentation mask can be tracked. In particular, removal 814 can be combined with feature map 812 by CNN 810 to generate feature map 816. For example, if interaction 804 indicates removal of an object, then removal 814 can contain information related to the object such that the object is removed from feature map 816.

CNN 810 can receive current probability distribution map 818 from unified library 806. CNN 810 can also have information related to previous probability distribution map 820. This information related to previous probability distribution map 820 can be stored as a hidden state of CNN 810. CNN 810 can combine current probability distribution map 818 and previous probability distribution map 820 with feature map 816. In particular, CNN 810 can combine current probability distribution map 818 with feature map 816 to generate first feature 822. CNN 810 can also combine previous probability distribution map 820 with feature map 816 to generate second feature 824. First feature 822 and second feature 824 can be concatenated to generate updated feature 826. Updated feature 826 can be input into classifier 828. Classifier 828 can be a classifier neural network that can generate a segmentation mask from the updated feature 826. For instance, the classifier neural network can include a decoder portion that can take the feature in a feature space that is not interpretable by a human and convert the feature back into an image state. In this way, classifier 828 can generate updated segmentation mask 830.

Figure 9:
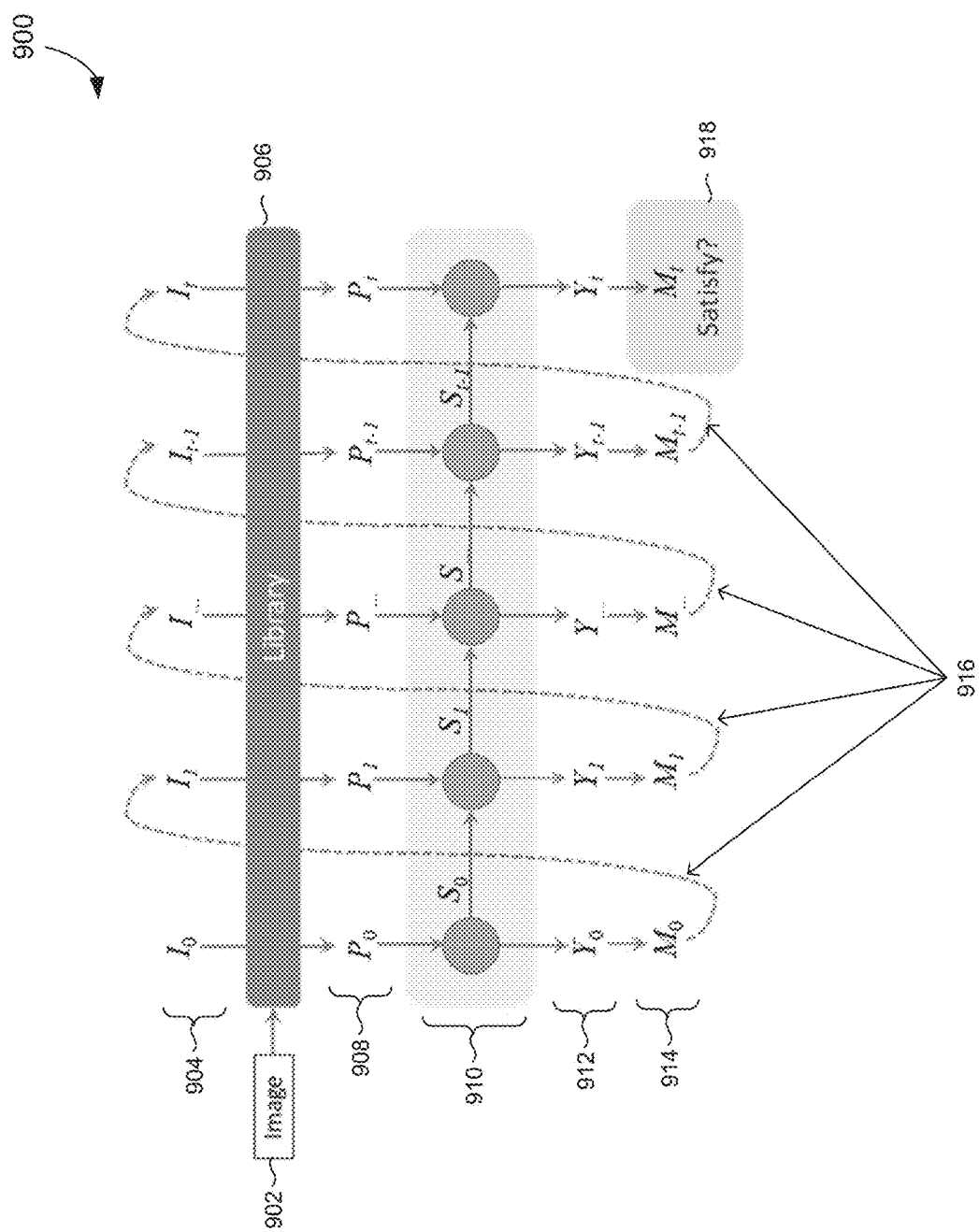
FIG. 9 illustrates an example environment that can be used for joint embedding supervision related to an integrated segmentation system that allows for optimal segmentation of an image based on multiple segmentations, in accordance with embodiments of the present disclosure.

FIG. 9 illustrates an example environment 900 that can be used for joint embedding supervision related to an integrated segmentation system that allows for optimal segmentation of an image based on multiple segmentations, in accordance with embodiments of the present disclosure. In particular, a convolutional RNN can be used for this joint embedding supervision. The convolutional RNN can combine the previous segmentation(s) with the current segmentation without requiring any information about the image segmentation method(s) used to generate the segmentations.

Image 902 can be received for segmentation. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

Interaction(s) 904 can be received. Interaction(s) 904 can be interactive inputs from a user. These interactions can be interactive object selections of image 902 by a user. Such an interactive object selection can be based on an interactive action (e.g., click, scribble, bounding box, and/or language). Based on interaction(s) 904, unified library 906 can select an image segmentation method for use in segmenting image 902. In some embodiments, a user can select the image segmentation method. For example, a user can explicitly select the method (e.g., via a graphical user interface interaction). In other embodiments, the image segmentation method that is used to segment the image can be selected by unified library 906 based on interaction 904.

Using the image segmentation method, unified library 906 can generate probability distribution map(s) 908 (e.g., $P_0$) according to image 902 and interaction(s) 904. Probability distribution map(s) 908 can be used to generate segmentation mask(s) 914 (e.g., $M_0$). Next a user can update interaction(s) 904 according to segmentation mask(s) 914. The updated interaction(s) 904 can be any type (e.g., same or different from the initial image segmentation method). Unified library 906 can select an image segmentation method for use in updating probability distribution map(s) 908. A convolutional RNN can be used to generated the updated probability distribution map(s) 908. For instance, an image segmentation method can update probability distribution map (e.g., $P_t$) as current output, and together with hidden state(s) 910 (e.g., $S_{t-1}$) to infer an updated probability distribution map 910 (e.g., $Y_t$). These steps can continue until a user is satisfied with a generated segmentation mask 914 (e.g., $M_t$).

Figure 10:
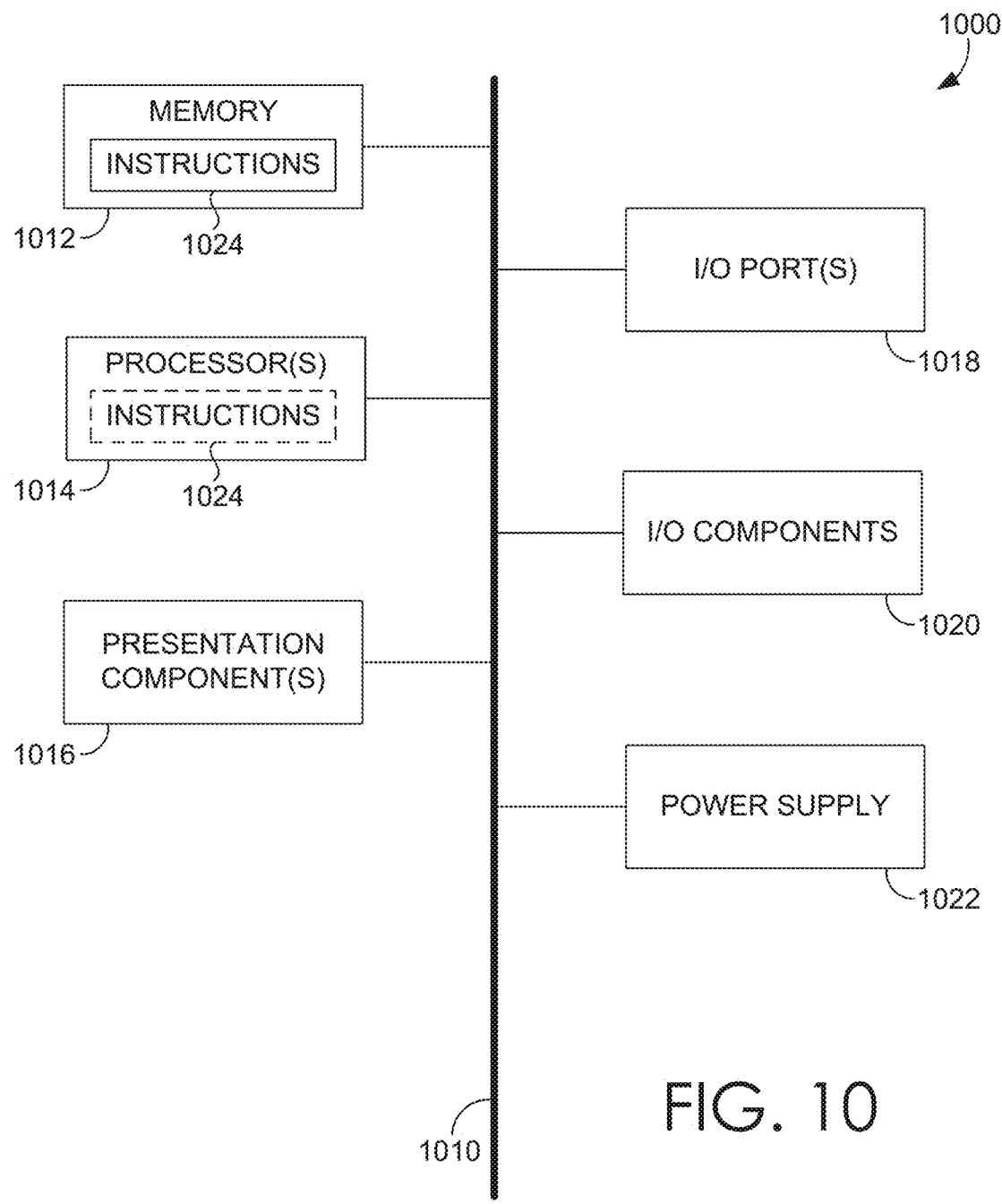
FIG. 10 is a block diagram of an example computing device in which embodiments of the present disclosure may be employed.

Having described embodiments of the present disclosure, an example operating environment in which embodiments of the present disclosure may be implemented is described below in order to provide a general context for various aspects of the present disclosure. Referring to FIG. 10, an illustrative operating environment for implementing embodiments of the present disclosure is shown and designated generally as computing device 1000. Computing device 1000 is but one example of a suitable computing environment and is not intended to suggest any limitation as to the scope of use or functionality of the disclosure. Neither should the computing device 1000 be interpreted as having any dependency or requirement relating to any one or combination of components illustrated.

Embodiments of the disclosure may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the disclosure may be practiced in a variety of system configurations, including hand-held devices, consumer electronics, general-purpose computers, more specialized computing devices, etc. Embodiments of the disclosure may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 10 is merely illustrative of an example computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of non-transitory computer-readable media. Non-transitory Computer-readable media can be any available media that can be accessed by computing device 1000 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Illustrative presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, the method comprising:
   receiving a first interaction with an image;
   receiving a second interaction with the image subsequent to the first interaction;
   based on the second interaction with the image, performing a segmentation of the image using a first segmentation method to generate a current probability distribution map;
   combining a feature map of the image with the current probability distribution map and combining the feature map with a previous probability distribution map, the previous probability distribution map generated based on a previous segmentation of the image, the previous segmentation based on the first interaction with the image and performed using a second segmentation method different from the first segmentation method; and
   generating a segmentation mask based on a concatenation of the feature map combined with the current probability distribution map and the feature map combined with the previous probability distribution map.

2. The computer-implemented method of claim 1, further comprising:
   generating the feature map for the image; and
   incorporating removal information into the feature map, the removal information based on the second interaction being a removal interaction that indicates an object, feature, or portion of the image for exclusion from the segmentation mask.

3. The computer-implemented method of claim 1, further comprising:
   determining an image segmentation method to use for the segmentation, wherein the image segmentation method is based on the first interaction.

4. The computer-implemented method of claim 1, wherein the feature map of the image is combined with the current probability distribution map and with the previous probability distribution map using a neural network to maintain a hidden state related to the previous probability distribution map;
   wherein the neural network is trained to perform the combining of the feature map of the image with the current probability distribution map, and perform the combining the feature map with the previous probability distribution map, without knowledge of which segmentation method was used to generate the current probability distribution map and without knowledge of which segmentation method was used to generate the previous probability distribution map.

5. The computer-implemented method of claim 1, wherein the segmentation mask is generated using a classification neural network to convert the feature map combined with the current probability distribution map and the previous probability distribution map into image-form.

6. The computer-implemented method of claim 5, wherein the classification neural network is trained to intelligently concatenate the feature map combined with the current probability distribution map and the previous probability distribution map.

7. The computer-implemented method of claim 6, wherein the neural network is trained to integrate various image segmentation methods, the training comprising:
   receiving the first interaction with a first image;
   based on the first interaction, performing a first segmentation of the first image to generate a first probability distribution map;
   storing the first probability distribution map using a hidden state;
   receiving the second interaction with the first image;
   based on the second interaction, performing a second segmentation of the first image to generate a second probability distribution map;
   combining an image feature map of the first image with the second probability distribution map and the first previous probability distribution map, first previous probability distribution map represented using the hidden state; and
   generating an optimized segmentation mask based on the image feature map combined with the second probability distribution map and the first probability distribution map.

8. The computer-implemented method of claim 7, the training further comprising:
   comparing the optimized segmentation mask with a ground-truth segmentation mask to determine error; and
   updating the neural network based on the determined error.

9. One or more non-transitory computer-readable media having a plurality of executable instructions embodied thereon, which, when executed by one or more processors, cause the one or more processors to perform a method, the method comprising:
   receiving a first interaction with an image;
   based on the first interaction with the image, performing a first segmentation of the image using a first segmentation method to generate a previous probability distribution map;
   receiving a second interaction with the image subsequent to the first interaction;
   based on the second interaction with the image, performing a second segmentation of the image using a second segmentation method different from the first segmentation method to generate a current probability distribution map;
   generating, using a neural network, a feature map of the image;
   combining, using the neural network, the feature map with the current probability distribution map to generate a first feature and the feature map with the previous probability distribution map to generate a second feature, wherein the previous probability distribution map is represented using a hidden state of the neural network, wherein the neural network is trained to perform the combining of the feature map of the image with the current probability distribution map, and perform the combining the feature map with the previous probability distribution map, without knowledge of which segmentation method was used to generate the current probability distribution map and the previous probability distribution map; and generating a segmentation mask based on a concatenation of the first feature and the second feature.

10. The media of claim 9, the method further comprising:
incorporating removal information into the feature map, the removal information based on the second interaction being a removal interaction that indicates an object, feature, or portion of the image for exclusion from the segmentation mask.

11. The media of claim 9, the method further comprising:
determining the first image segmentation method to use for the first segmentation, wherein the first image segmentation method is based on the first interaction; and determining the second image segmentation method to use for the segmentation, wherein the second image segmentation method is based on the second interaction.

12. The media of claim 9, the method further comprising:
receiving an indication of an image segmentation method to use for the segmentation, wherein the indication is input by a user.

13. The media of claim 9, the method further comprising:
receiving a further interaction with the image;
based on the further interaction, performing a subsequent segmentation of the image to generate a subsequent probability distribution map;
combining, using the neural network, the feature map with the subsequent probability distribution map to generate an updated first feature and the current probability distribution map to generate an updated second feature, wherein the current probability distribution map is represented using an updated hidden state of the neural network; and
generating an optimized segmentation mask based on a new concatenation of the updated first feature and the updated second feature.

14. The media of claim 9, wherein the neural network system is trained by:
receiving the first interaction with a first image;
based on the first interaction, performing the first segmentation of the first image to generate a first probability distribution map;
storing the first probability distribution map using a first hidden state;
receiving the second interaction with the first image;
based on the second interaction, performing the second segmentation of the first image to generate a second probability distribution map;
combining an image feature map of the first image with the second probability distribution map and the first previous probability distribution map, first previous probability distribution map represented using the first hidden state; and generating an optimized segmentation mask based on the image feature map combined with the second probability distribution map and the first probability distribution map.

15. The media of claim 14, the training further comprising:
comparing the optimized segmentation mask with a ground-truth segmentation mask to determine error; and
updating the neural network based on the determined error.

16. The media of claim 9, the method further comprising:
generating a unified library of image segmentation methods, wherein the neural network is trained using one or more of the image segmentation methods.

17. A computing system comprising:
means for receiving a first interaction with an image;
means for receiving a second interaction with the image subsequent to the first interaction;
means for performing segmentation of the image using a first segmentation method based on the second interaction with the image to generate a current probability distribution map;
means for combining a feature map of the image with the current probability distribution map to generate a first feature and for combining the feature map with a previous probability distribution map to generate a second feature, the previous probability distribution map generated based on a previous segmentation of the image, the previous segmentation based on the first interaction with the image and performed using a second segmentation method different from the first segmentation method; and
means for generating a segmentation mask based on a concatenation of the first feature and the second feature.

18. The system of claim 17, further comprising:
means for incorporating removal information into the feature map, the removal information based on the second interaction being a removal interaction that indicates an object, feature, or portion of the image for exclusion from the segmentation mask.

19. The system of claim 17, further comprising:
means for determining an image segmentation method to use for the segmentation, wherein the image segmentation method is based on the interaction.

20. The system of claim 17, further comprising:
means for generating a unified library of image segmentation methods, wherein a neural network is trained using one or more of the image segmentation methods.

* * * * *